(12) United States Patent
Aikins et al.

(10) Patent No.: US 7,654,156 B1
(45) Date of Patent: Feb. 2, 2010

(54) DISTAL TIP OF FLUID VELOCITY PROBE

(75) Inventors: Brian Aikins, Everett, WA (US); Zoltán István Molnár, Calgary (CA)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 11/858,794

(22) Filed: Sep. 20, 2007

(51) Int. Cl.
*G01F 1/44* (2006.01)
(52) U.S. Cl. .................................. 73/861.63
(58) Field of Classification Search ............. 73/861.65, 73/204.15, 204.16
See application file for complete search history.

(56) References Cited

U.S. PATENT DOCUMENTS

| 4,833,917 | A | * | 5/1989 | Wilson | 73/170.14 |
|---|---|---|---|---|---|
| 5,780,737 | A | * | 7/1998 | Wible et al. | 73/204.22 |
| 6,658,931 | B1 | * | 12/2003 | Plumb et al. | 73/204.15 |
| 2007/0137297 | A1 | | 6/2007 | Gehman et al. | |
| 2007/0144250 | A1 | | 6/2007 | Ramsesh | |

FOREIGN PATENT DOCUMENTS

WO 2007/075510 A2 7/2007

* cited by examiner

*Primary Examiner*—Jewel Thompson
(74) *Attorney, Agent, or Firm*—Christensen O'Connor Johnson Kindness PLLC

(57) ABSTRACT

A distal tip of a fluid velocity probe generally includes at least a portion of a housing having first and second sidewalls defining a passageway therebetween, the passageway having inlet and outlet regions. The first and second sidewalls each are substantially symmetrical along an axis extending in the direction of the passageway through the center of each sidewall. The distal tip further includes a mass flow sensor disposed in the passageway between the inlet and outlet regions.

27 Claims, 7 Drawing Sheets

US 7,654,156 B1

DISTAL TIP OF FLUID VELOCITY PROBE

TECHNICAL FIELD

The present disclosure relates generally to fluid velocity probes and, more particularly, to distal tips of fluid velocity probes.

BACKGROUND

Thermal mass flow sensors are commonly used to detect fluid velocity. These sensors are typically used in static applications, for example, housed in wall-mounted housings. In smaller sized housings, however, for example, in dynamic, portable detection devices, the performance of the these thermal mass flow sensors can be affected by housings that are not aerodynamically optimized to accommodate the sensor. Therefore, there exists a need for an improved distal tip for a fluid velocity probe that is small in size, for example, having a diameter equal to or less than about ⅜-inch, and that is aerodynamically optimized to accommodate a standard thermal mass flow sensor.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a distal tip of a fluid velocity probe is provided. The distal tip generally includes at least a portion of a housing having first and second sidewalls defining a passageway therebetween, the passageway having inlet and outlet regions. The first and second sidewalls each are substantially symmetrical along an axis extending in the direction of the passageway through the center of each sidewall. The distal tip further includes a mass flow sensor disposed in the passageway between the inlet and outlet regions.

In accordance with another embodiment of the present disclosure, a distal tip of a fluid velocity probe is provided. The distal tip generally includes at least a portion of a substantially cylindrical housing, wherein the housing includes first and second sidewalls defining a passageway therebetween having inlet and outlet regions. The housing has a diameter of less than or equal to about ⅜-inch. The distal tip further includes a thermal mass flow sensor disposed in the passageway between the inlet and outlet regions.

In accordance with yet another embodiment of the present disclosure, a distal tip of a fluid velocity probe is provided. The distal tip generally includes at least a portion of a housing having first and second sidewalls defining a passageway therebetween having inlet and outlet regions. The distal tip further includes a thermal mass flow sensor disposed in the passageway between the inlet and outlet regions, wherein the sensor measures an electrical property delivered to the sensor to maintain a predetermined temperature at the sensor, and wherein the relationship between the electrical property and the mass flow of surrounding fluid is a curve that can be fit to one of a fourth order polynomial and a multiple point interpolation.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
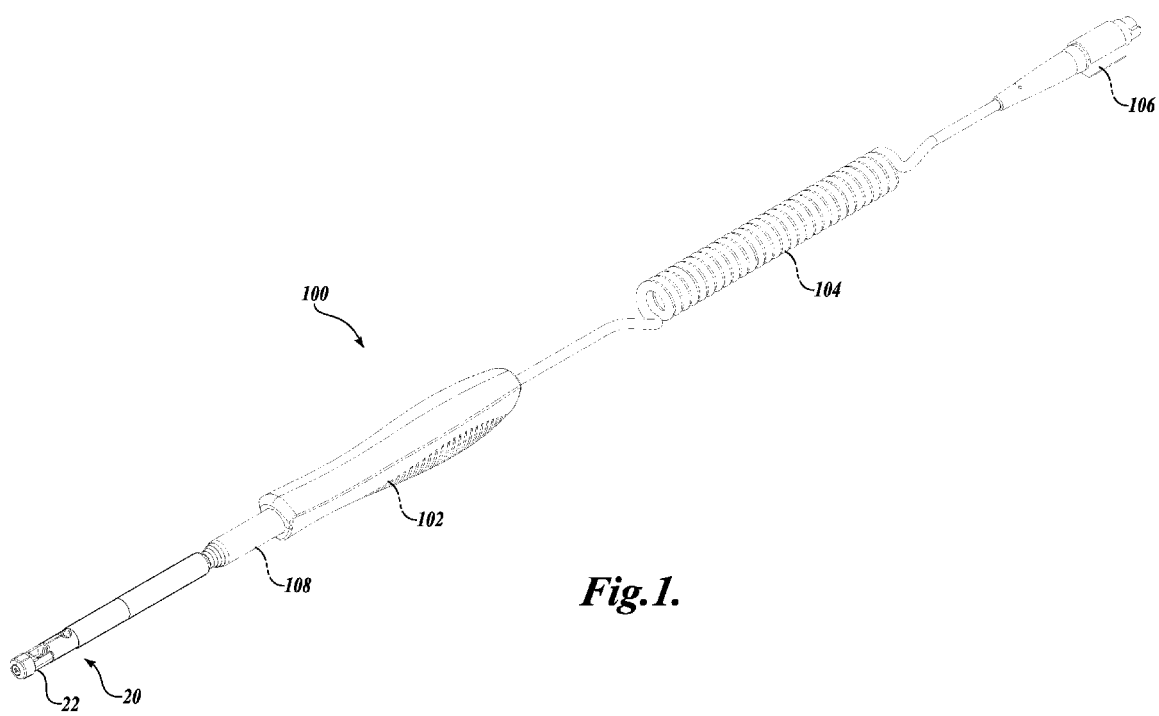
FIG. 1 is a perspective front view of a fluid velocity probe in accordance with one embodiment of the present disclosure.
Figure 2:
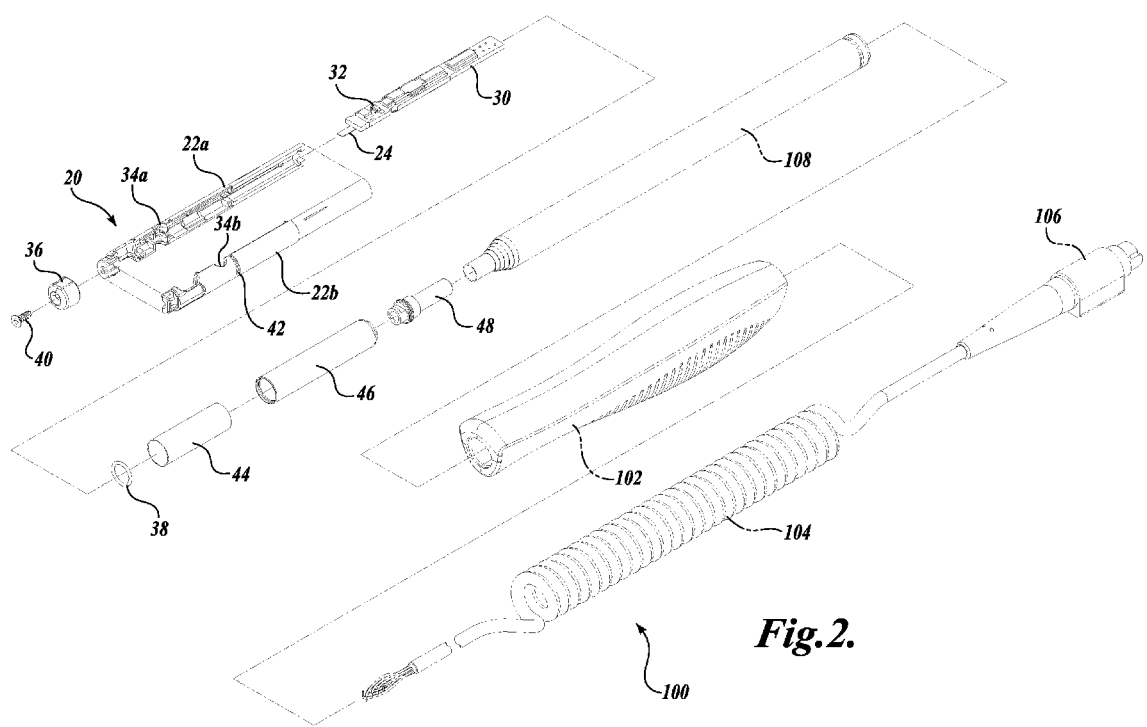
FIG. 2 is an exploded view of the fluid velocity probe of FIG. 1.
Figure 3:
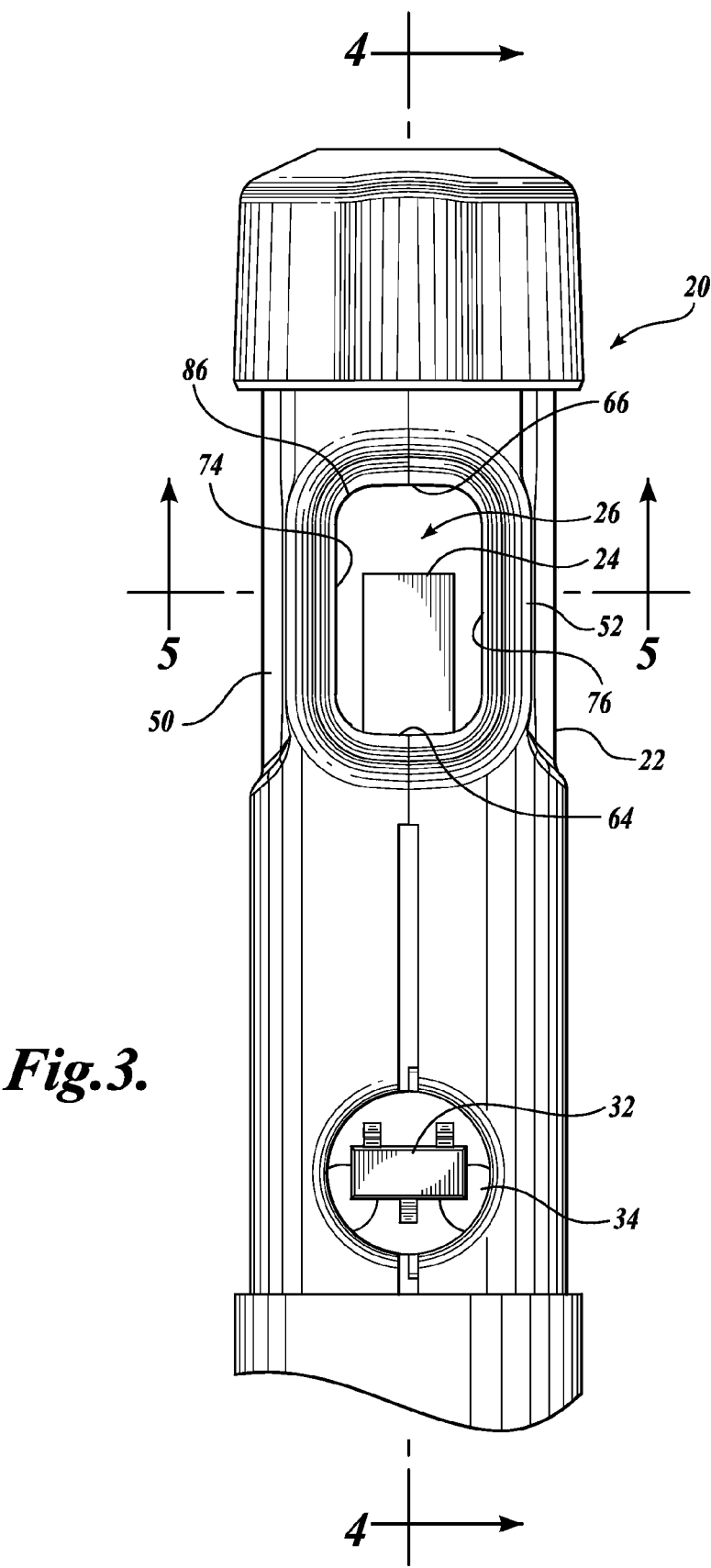
FIG. 3 is a partial, front view of the distal tip of the fluid velocity probe of FIG. 1.

Embodiments of the present disclosure are generally directed to distal tips of fluid velocity probes for detecting mass flow of fluids in which the distal tips are immersed. Referring to FIGS. 1-3, there is shown a distal tip 20 of a fluid velocity probe 100, constructed in accordance with the one embodiment of the present disclosure. The fluid velocity probe 100 generally includes a housing 22 and a mass flow sensor 24 disposed within a passageway 26 in the housing 22, as best seen in FIG. 3. As will be described in detail below, the passageway 26 and the mass flow sensor 24 are cooperatively configured and arranged for aerodynamic fluid flow in a compact housing 22, which allows embodiments of the distal tip 20 to be suitably sized for insertion into small spaces, such as a ⅜-inch hole drilled into an air duct, for example, in a commercial or residential building.

It should be appreciated that the terms "fluid" and "fluids" as used herein, generally refer to compressible fluids, such as gases. However, it should be appreciated that some embodiments of the present disclosure may also be used with incompressible fluids, such as liquids.

As best seen in FIG. 1, the fluid velocity probe 100 includes a handle assembly 102 having a cord or cable 104 that terminates as a connector 106, such as a plug. The handle assembly 102 may also include an optional telescoping extension section 108 for extending the fluid velocity probe 100 from the handle assembly 102. The connector 106 may be attachable to a monitoring device (not shown), such as a multi-function monitoring device, for example, the device described in U.S. patent application Ser. Nos. 11/842,880 and 29/283,724, both filed on Aug. 21, 2007, the disclosures of which are hereby incorporated by reference. In that regard, the monitoring device may be sized and configured to be portable, for example, to be carried in a single hand of a user. However, it should be appreciated that non-portable or stationary testing devices are also within the scope of the present disclosure.

Although depicted in the illustrated embodiment as having a cable 104 and a connector 106, it should be appreciated that the fluid velocity probe 100 may also be a remote device, capable of wirelessly communicating with a monitoring device via a known wireless protocol. It should further be appreciated that the fluid velocity probe 100 may be a discrete device separate from a monitoring device, for example, having its own discrete electronics and display components. The fluid velocity probe 100 may optionally be combined with other sensors besides a mass flow sensor, for example, a fluid composition sensor for measuring fluid composition in combination with, or separate from, fluid mass flow.

Figure 4:
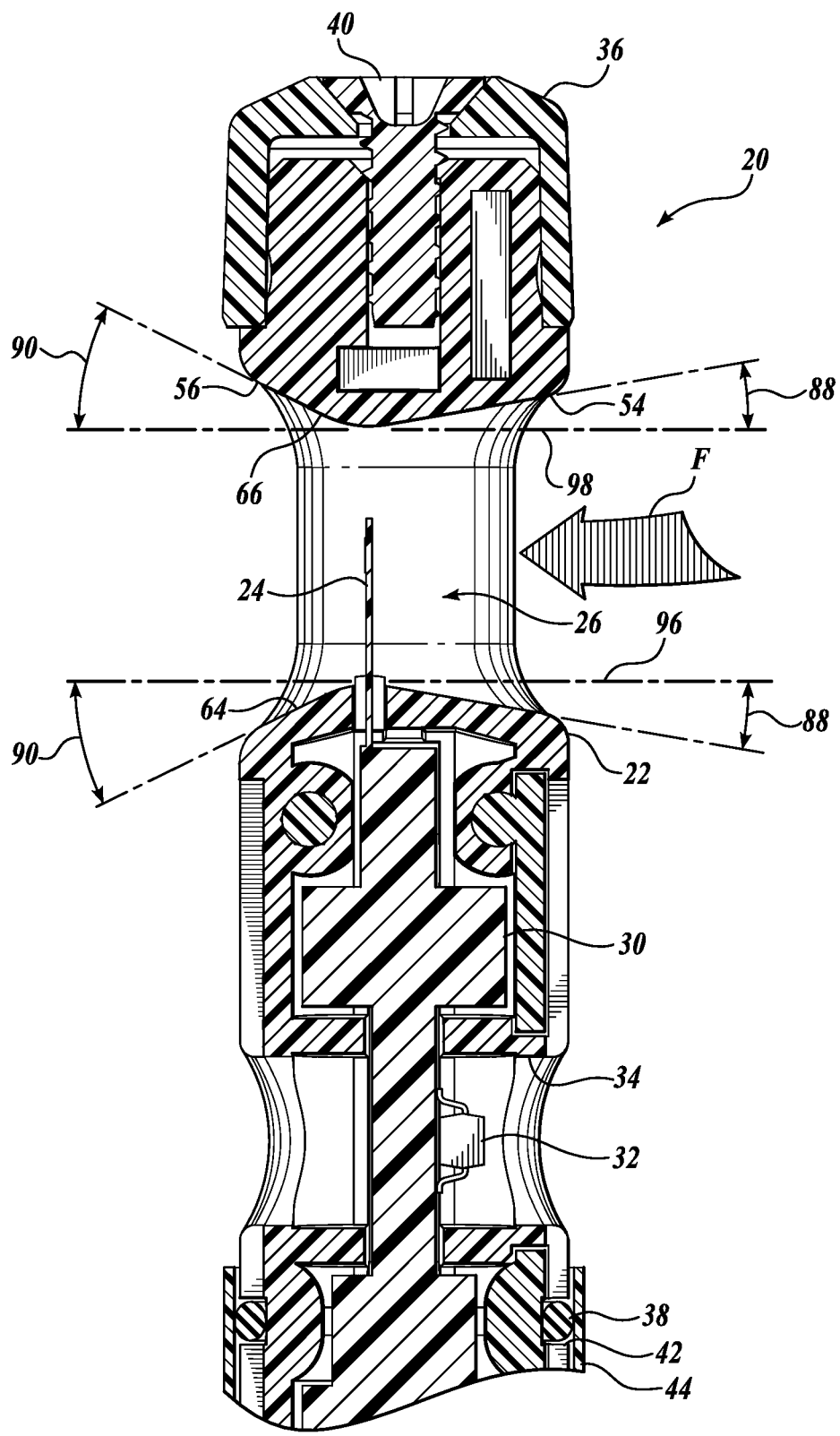
FIG. 4 is a partial, cross-sectional view of the distal tip of the fluid velocity probe of FIG. 3 taken through the plane 4-4 shown in FIG. 3.

As mentioned above, the fluid velocity probe 100 generally includes a housing 22 and a mass flow sensor 24 disposed within the passageway 26 of housing 22. As best seen in FIGS. 2 and 4, the mass flow sensor 24 may be mounted on one side of a printed circuit board 30 such that at least a portion of the sensor 24 extends into the passageway 26. The fluid velocity probe 100 may further include an ambient temperature sensor 32. In the illustrated embodiment, the temperature sensor 32 is located on the printed circuit board and is exposed to ambient fluid through a hole 34 formed in the housing 22 (see FIGS. 3 and 4). Various temperature sensors are known in the art, including, but not limited to, resistance temperature detectors (RTDs), thermistors, thermocouples, semiconductors, etc. It should be appreciated that the temperature sensor 32 may be suitably spaced and/or insulated from the mass flow sensor 24 so as to reduce any error caused to either sensor by thermal conductive energy exchanged between the temperature sensor 32 and the mass flow sensor 24. In one suitable embodiment, the passageway 26 is spaced a distance of at least about 9 mm from the hole 34 within which the temperature sensor 32 is located.

In the illustrated embodiment, the housing 22 is shown disassembled in two halves 22a and 22b, which can be joined together around the printed circuit board 30 and the sensor 24. When the housing 22 is assembled, the fluid velocity probe 100 may further include additional components connected to the housing 22 for the purpose of structural integrity. In that regard, a cap 36 and an O-ring 38 may be employed to secure the two halves 22a and 22b of the housing 22 in a joined orientation (see FIG. 4). In the illustrated embodiment, the cap 36 is releasably secured to the housing by a fastener 40, and the O-ring 38 is received in a groove 42 extending around the outer surface of the housing 22 when the two halves 22a and 22b are joined together.

A sensor cover 44 fits over the housing 22 and optionally covers the openings to the passageway 26 for protecting the sensor 24 from damage, debris, or contamination when not in use. The O-ring 38 provides for a tight fit of the sensor cover 44, such that some manual force is required to move the sensor cover 44 over the O-ring 38 between the covered and uncovered passageway 26 orientations (see FIG. 4). A retainer 46 fits over the lower portion of the housing 22 and provides additional structural integrity to the fluid velocity probe 100. In that regard, while the housing 22 may be manufactured from a formable material, such as a moldable plastic, the retainer 46 may be manufactured from a material to provide additional strength to the fluid velocity probe 100 to prevent bending or breakage of the probe 100 during use. Suitable materials for the retainer 46 include, but are not limited to, metals, such as aluminum, and more durable plastics. A cable guide 48 guides and protects cables extending from the housing 22.

The mass flow sensor 24 will now be described in greater detail. The sensor 24 is suitably a thermal mass flow sensor that measures fluid velocity by a thermal measuring principle. In that regard, the sensor 24 measures fluid mass flow rate by measuring convective cooling of the sensor as a function of the voltage required to maintain the sensor at a constant temperature. It should be appreciated, however, that the fluid mass flow rate may also be correlated to other electrical properties, such as power and/or current measurements, either in the alternative or in addition to voltage measurements. As non-limiting examples, suitable sensors include FLOW SENS FS1 and FLOW SENS FS1A, both manufactured by INNOVATIVE SENSOR TECHNOLOGY (IST).

The IST sensors have a response time of less than about 2 seconds and a measuring range for fluid velocity from about 0.1 m/s to about 100 m/s.

Figure 5:
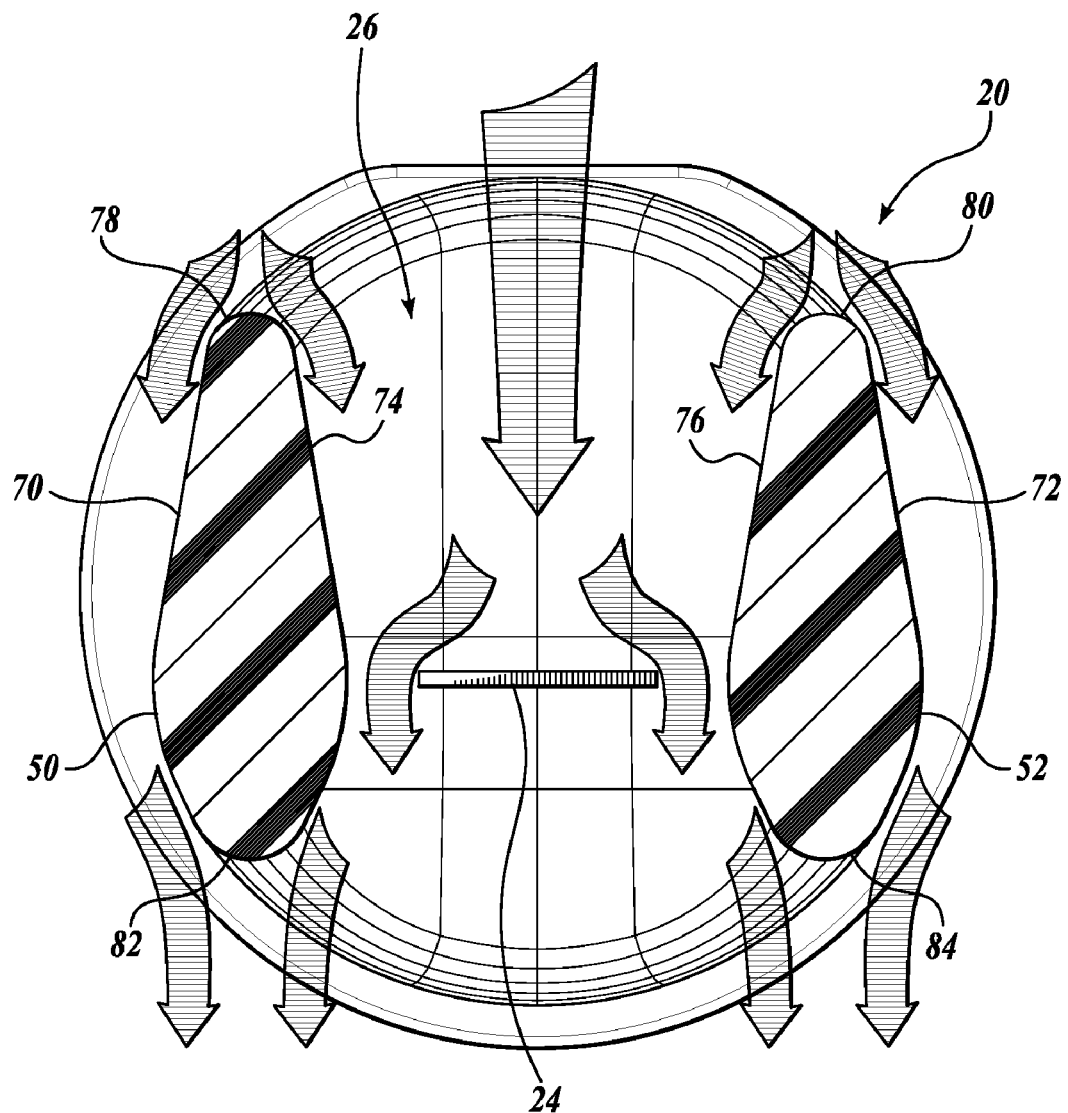
FIG. 5 is a cross-sectional view of the distal tip of the fluid velocity probe of FIG. 3 taken through the plane 5-5 shown in FIG. 3.

As a non-limiting example, a suitable mass flow sensor is about 7 mm in length, about 2.4 mm in width, and about 0.15 mm in thickness. As seen in the illustrated embodiment, the sensor 24 generally has a flat planar side face upon which fluid flow is received for mass flow to be detected. As best seen in FIG. 5, the mass flow sensor 24 is designed to be orientated such that the fluid F flows in a direction substantially perpendicular to the face of the sensor 24. However, it should be appreciated that off-axis fluid streams may also be detectable by the sensor 24. As described in greater detail, the performance of the mass flow sensor 24 can be affected by the aerodynamics of the surrounding compact housing.

The mass flow sensor 24 generally has two temperature depending resistors, a first resistor that is a low-ohm resistor with a small area that is used to heat the sensor, and a second resistor that is a high-ohm resistor that measures the temperature of the sensor. Through a bridge circuit, the difference in resistance values between the two resistors results in changes in voltage required to heat the sensor. In that regard, the temperature of the sensor is dependent upon three variables: the applied voltage to the heater, the mass flow of the surrounding fluid, and the media (e.g., liquid or gas), as well as the temperature of the media (e.g., as measured by discrete temperature sensor 32), in which the distal tip 20 is located. As a non-limiting example, higher voltage generally increases the temperature of the sensor, and a higher mass flow rate of the surrounding fluid generally increases cooling (i.e., by convective cooling). If the temperature of the sensor 24 is maintained at a constant temperature by a suitable controller, the voltage will increase with higher mass flow rates of the surrounding fluid, and therefore, the voltage can be used by a correlative relationship of voltage versus fluid velocity to measure the mass flow of the surrounding fluid. An exemplary voltage versus fluid velocity curve is depicted as curve A in FIG. 7. It should be appreciated that the mass flow sensor 24 may include one or more flow sensor chips, as described in U.S. Patent Application Publication No. 2007/0137297 A1, invented by Gehman et al., published on Jun. 21, 2007.

As mentioned above, the mass flow sensor 24 may be mounted on the printed circuit board 30, as best seen in FIG. 2. In that regard, the sensor 24 includes a plurality of leads (not shown) designed for surface mounting. However, it should be appreciated that the sensor 24 may be modified for different electrical connection methods, such as leads configured as pin connections for thru-hole mounting.

The printed circuit board 30 may include any suitable control electronics, as deemed necessary for controlling the sensor 24 and other systems of the fluid velocity probe 100. Examples of suitable control electronics include data memories, data signal receivers, circuits, such as analog signal conditioning circuits, and firmware, such as in microcontrollers, microprocessors, minicomputers, etc. While the printed circuit board 30 is shown in the illustrated embodiment as residing in the housing 22 together with the mass flow sensor 24, it should be appreciated that the printed circuit board 30 or another electronic control system for the mass flow sensor 24 may be suitably housed in the connector 106 of the fluid velocity probe 100 or in a monitoring device (not shown), and electrically connected to the mass flow sensor 24 via any suitable means.

As a non-limiting example of suitable control electronics, the fluid velocity sensor 100 may include a sensor interface/control module, as described in U.S. Patent Application Publication No. 2007/0144250 A1, invented by Ramsesh, published on Jun. 28, 2007, the disclosure of which is hereby incorporated by reference. The sensor interface/control module may serve as an interface between components of the fluid velocity probe 100 and/or other connected components, for example, components of the monitoring device, and may also serve as a control system for the fluid velocity probe 100. In one embodiment, the sensor interface/control module monitors the temperature of the fluid as measured by the ambient temperature sensor 32 and adjusts the desired temperature of the mass flow sensor 24 to a predefined differential temperature compared to the temperature of fluid as measured by the temperature sensor 32. For example, the target temperature of the mass flow sensor 24 may be set at +30° F. temperature differential compared to the temperature of the fluid, as measure by the ambient temperature sensor 32. In another embodiment, the sensor interface/control module applies correction factors to the mass flow sensor 24 to compensate for changes in the heat transfer coefficient of the sensor 24 caused by degradation.

Figure 7:
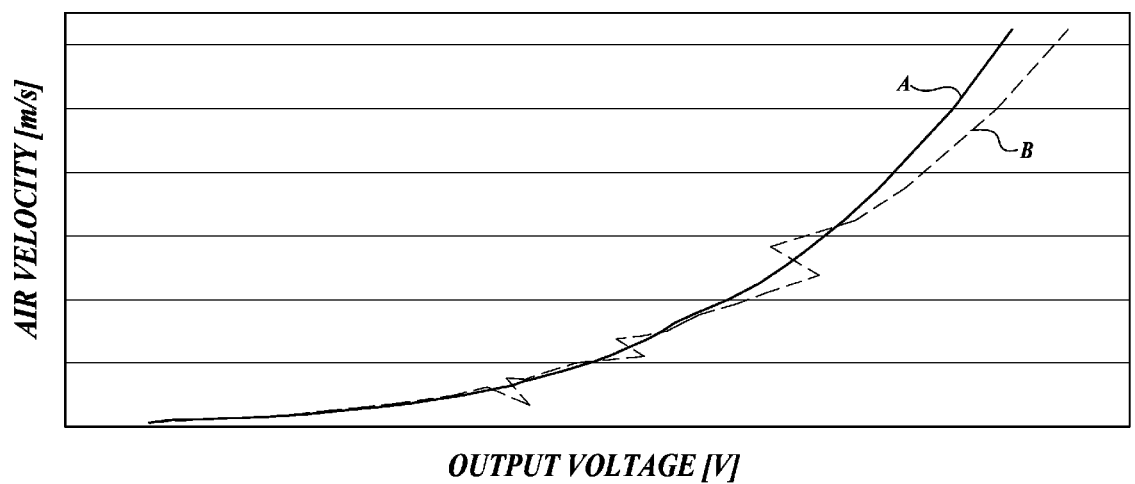
FIG. 7 is a graphical illustration of fluid velocity versus output voltage for the fluid velocity probe of FIG. 1.

In yet another embodiment, the sensor interface/control module self-calibrates the mass flow sensor 24. In that regard, an exemplary curve A can be seen in FIG. 7, showing the relationship between voltage and flow velocity for a target range of about 0.25 to about 15 m/sec is a nonlinear curve that can be fit to a linear algorithm for calibration purposes, such as a fourth order polynomial or a multiple point interpolation. As described in greater detail below, a smooth curve that defines the relationship between voltage and flow velocity is important for accurate calibration of the mass flow sensor 24, having, as non-limiting examples, a level of accuracy of about +/− about 4% and/or +/− about 0.015 m/s.

The distal tip 20 of the fluid velocity probe 100 will now be described in greater detail. As mentioned above, at least a portion of the housing 22 is configured to encase and protect the mass flow sensor 24, while allowing fluid flow to pass through the housing 22 so that the sensor 24 can detect the velocity of the fluid. In the illustrated embodiment, the housing 22 is a substantially cylindrical housing having first and second sidewalls 50 and 52 disposed in surrounding relationship with the passageway 26; thus, the passageway extends between the sidewalls 50 and 52. In the illustrated embodiment, the first and second sidewalls 50 and 52 are substantially identical in size and shape. The passageway 26 has an inlet 54 at one end of the sidewalls 50 and 52 and an outlet 56 at the other end of the sidewalls 50 and 52 through which fluid flows. The sensor 24 is disposed in the passageway 26. It should be appreciated that the inlet region is generally described herein as the region in the passageway 26 between the inlet 54 and the sensor 24, and the outlet region is generally described herein as the region in the passageway 26 between the sensor 24 and the outlet 56. The design and configuration of the housing 22 relative to the mass flow sensor 24 is described in greater detail below.

In accordance with embodiments of the present disclosure, the distal tip 20 may be sized so as to be insertable into a small space. As a non-limiting example, users of the probe can insert the distal tip 20 into an air duct by drilling a ⅜-inch hole using a standard ⅜-inch plug cutter. Therefore, in accordance with one embodiment of the present disclosure, the distal tip 20 has a diameter of less than or equal to about ⅜-inch. In another embodiment, the distal tip 20 has approximately a 4 mm diameter. However, it should be appreciated that distal tips 20 designed in accordance with embodiments described herein having greater than about ⅜-inch diameters are also within the scope of the present disclosure. It should also be appreciated that the distal tip 20 may be designed to have a substantially circular cross-section or any other shaped cross-section.

The distal tip 20 is further designed to survive the drop test, which comprises a drop from 1 meter in its most damaging orientation onto a hard surface, such as a solid oak platform. In that regard, the sidewalls 50 and 52 of the housing 22 must be designed to have a minimum specific thickness along the entirety of each of the sidewalls 50 and 52 so as not to be cracked or damaged when dropped. In one embodiment, the sidewall thickness is at least about 1 mm at its widest thickness. In one embodiment of the present disclosure, the sidewall thickness is about 1.95 mm at its widest thickness. In addition, the sensor 24 must be suitably located within the housing 22 so as not to be damaged during the drop test. As a non-limiting example, the sensor 24 may be positioned between the sidewalls 50 and 52 and a specific distance from the inlet 54 and the outlet 56 so as to avoid being damaged during the drop test.

Referring to FIGS. 3-5, the passageway 26 is suitably sized such that fluid can flow above and on both sides of the sensor 24 in the passageway 26. In the illustrated embodiment, the passageway 26 is substantially rectangular in cross-section of varying dimensions, having two sidewalls 50 and 52, a lower wall 64 and an upper wall 66, as best seen in FIG. 3. The substantially rectangular cross-section of passageway 26 varies dimensionally as it extends from the inlet 54 to the outlet 56, thus forming a converging/diverging nozzle. Although the terms "side," "lower," and "upper" walls are used herein, it should be appreciative that these terms are used to describe the sensor in the upright orientation depicted in FIG. 3 and are not intended to be limiting.

In one embodiment, the passageway 26 is sized such that the exposed portion of the sensor 24 blocking the passageway 26 is within the range of about 20 to about 60 percent of the passageway 26 area. In another embodiment, the passageway 26 is sized such that the exposed portion of the sensor 24 blocking the passageway 26 is within the range of about 30 to about 50 percent of the passageway 26 area. As a non-limiting example, in a substantially rectangular passageway (for example, as seen in FIG. 3), the passageway 26 has a width of 3.88 mm and a length of 6.58 mm, equaling a total area of 25.53 mm$^2$, and the exposed portion of the sensor 24 has a width of 2.40 mm and an exposed length of 4.24 mm, equaling a total surface area of 10.18 mm$^2$, which is about 40 percent of the passageway 26 area.

Referring to FIG. 3, in one embodiment of the present disclosure, the sensor 24 is centered in the housing 22 between the sidewalls 50 and 52, such that there is substantially equal spacing on either side of the sensor 24 between the edges of the sensor 24 and the respective sidewalls 50 and 52 of the housing 22. However, it should be appreciated that substantially equidistant sidewall spacing is not required. In that regard, suitable spacing tolerances of +/−20 percent are within the scope of the present invention. It should further be appreciated that the sensor 24 extends in the passageway 26 from the lower wall 64 of the passageway 26; therefore, a majority of the spacing is between the sensor 24 and an upper wall 66 of the passageway 26.

Although the sensor 24 is generally centered in the passageway 26 in the illustrated embodiment between the first and second sidewalls 50 and 52, the sensor 24 is offset between the inlet 54 and outlet 56 in the illustrated embodiment so as to be more closely positioned to the outlet 56 of the passageway 26, as best seen in FIG. 4. In that regard, the inlet region is longer in length than the outlet region. The reason for the offset positioning of the sensor 24 in the passageway 26 is that the sensor 24 is surface-mounted on one side of printed circuit board 30, as described above, which results in offset positioning in the passageway 26 between the inlet 54 and the outlet 56. However, it should be appreciated that embodiments directed to sensors centered in the passageway 26 between the inlet 54 and outlet 56 or sensors offset toward the inlet 54 are also within the scope of the present disclosure.

Figure 6:
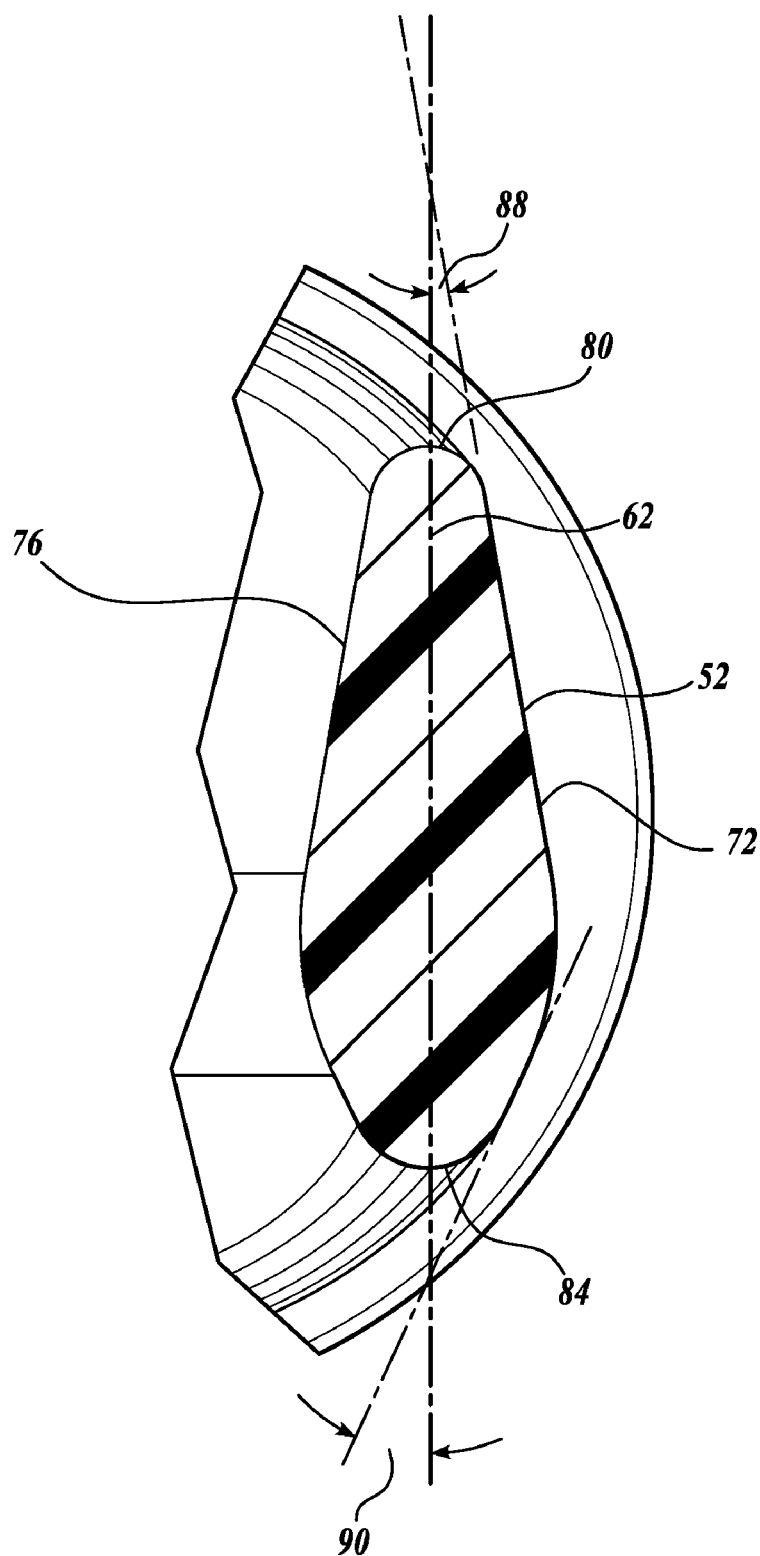
FIG. 6 is a partial, cross-sectional view of the distal tip of the fluid velocity probe of FIG. 3 taken through the plane 5-5 shown in FIG. 3.

Referring now to FIGS. 5 and 6, the first and second sidewalls 50 and 52 each have substantial symmetry along their respective axes (axis 62 is shown in FIG. 6) extending in the direction of the passageway 26 (i.e., perpendicular to the face of the sensor 24 in the passageway 26) through the center of each sidewall 50 and 52. In the illustrated embodiment, the sidewalls 50 and 52 each have a maximum width along their respective axes extending in the direction of the passageway 26 at a location between leading 78 and 80 and trailing 82 and 84 edges of the respective first and second sidewalls 50 and 52. In the illustrated embodiment, the maximum width of the sidewalls is substantially aligned with the sensor 24 positioning in the passageway 26 between the inlet 54 and the outlet 56.

As best seen in FIG. 5, fluid F is directed around both the first and second sidewalls 50 and 52 at the inlet 54. Some of the fluid F travels outside the sidewalls 50 and 52 in proximity to the outer surfaces 70 and 72 of the respective sidewalls 50 and 52, and some of the fluid F travels inside the sidewalls 50 and 52 from the inlet 54 to the outlet 56 through passageway 26 in proximity to the inner surfaces 74 and 76 of the respective sidewalls 50 and 52.

The symmetry of the first and second sidewalls 50 and 52 along their respective axes (axis 62 is shown in FIG. 6) extending in the direction of the passageway 26 improves the aerodynamics of the housing 22 with respect to the sensor 24. While not wishing to be bound by theory, it is believed by the inventors that the substantially symmetrical design of the first and second sidewalls 50 and 52 allows fluid F to flow a substantially equal distance around the sidewalls 50 and 52 in proximity to the outer surfaces 70 and 72 of the respective sidewalls 50 and 52 and in proximity to the inner surfaces 74 and 76 of the respective sidewalls 50 and 52. In that regard, it is believed that equidistance at the outer and inner surfaces substantially results in a more stable, laminar flow. Such laminar flow tends to have less eddy currents than more turbulent flows at the outlet 56 of the passageway 26 where the inner and outer surfaces rejoin and, therefore, improves the fluid flow around the mass flow sensor 24 for improved mass flow detection.

Referring to FIG. 5, the leading 78 and 80 and trailing 82 and 84 edges of the respective first and second sidewalls 50 and 52 are further rounded to enhance the aerodynamics of the system. In one embodiment, the leading and trailing edges are rounded to have approximately a 0.64 mm radius. In another embodiment, the leading and trailing edges are rounded in the range of about 0.1 mm to about 1.1 mm radii. It should be appreciated, however, that larger radius, "more rounded" edges provide an advantage over the smaller radius, "less rounded" edges in that the more rounded edges are more resilient to breakage, chipping, or other damage than the less rounded edges, particularly when subjected to the 1 m drop test described above.

In addition to rounded leading and trailing edges, a substantially rectangular passageway 26, as seen in FIG. 3, may also have rounded corners 86 to further enhance the aerodynamics of the system. In the one embodiment, the corners 86 of the substantially rectangular passageway 26 are rounded to have approximately a 0.99 mm radius. In another embodiment, the corners are rounded in the range of about 0.1 mm to about 1.3 mm radii.

As best seen in FIG. 6, the first and second sidewalls 50 and 52 taper outwardly from their respective axes on the respective outer and inner surfaces 70, 72, 74, and 76 in the inlet region. In addition, the first and second sidewalls 50 and 52 taper inwardly from their respective axes on the respective outer and inner surfaces 70, 72, 74, and 76 in the outlet region. In the illustrated embodiment, the inlet region taper 88 is about 10 degrees from the respective center axes 60 and 62, and the outlet region taper 90 is about 25 degrees from the respective center axes 60 and 62. In another embodiment, the inlet region taper may be in the range of about 5 to about 15 degrees from the respective center axes 60 and 62, and the outlet region taper may be in the range of about 5 to about 30 degrees from the respective center axes 60 and 62.

Referring now to FIG. 4, substantially similar angles for inlet and outlet region tapers are seen in lower and upper walls 64 and 66 of the passageway 26. In the illustrated embodiment, the inlet region taper 88 of the lower and upper walls 64 and 66 is an inward taper of about 10 degrees from planes 96 and 98 extending through the passageway 26, tangential to the lower and upper walls 64 and 66 at the constriction and perpendicular to the sensor 24. The outlet region taper 90 of the lower and upper walls 64 and 66 is an outward taper of about 25 degrees also from planes 96 and 98 extending through the passageway 26, tangential to the lower and upper walls 64 and 66 at the constriction and perpendicular to the sensor 24. In another embodiment, the inlet region taper may be in the range of about 5 to about 15 degrees, and the outlet region taper may be in the range of about 5 to about 30 degrees. However, it should be appreciated that the inlet and outlet region tapers in lower and upper walls 64 and 66 of the passageway 26 need not correspond with the inlet and outlet region tapers in the sidewalls 50 and 52 of the passageway 26.

It should be appreciated that as the inner walls 74 and 76 and lower and upper walls 64 and 66 all taper in the inlet and outlet regions, the passageway 26 converges in the cross-sectional area in the inlet region toward the sensor 24 and diverges in the cross-sectional area in the outlet region away from the sensor 24. As such, the passageway 26 forms a converging/diverging nozzle. In the illustrated embodiment, the cross-sectional plane having the most constricted flow area of the passageway 26 is located in the same cross-sectional plane as the mass flow sensor 24, as best seen in FIGS. 4 and 5. Although the constriction in the passageway 26 is offset toward the outlet 56 because the sensor 24 is offset toward the outlet 56, as described above, it should be appreciated that, like the sensor 24, the constriction may also be centered between the inlet 54 and the outlet 56 or, alternatively, offset toward the inlet 54.

While not wishing to be bound by theory, it is further believed that the Venturi effect created by the constriction also improves the fluid flow around the mass flow sensor 24 for improved mass flow detection. Further, while the changes in tapering between the inlet and outlet regions at the constriction are shown as being rounded (for example, at the outer and inner surfaces 70, 72, 74, and 76 of the sidewalls 50 and 52 and the lower and upper walls 64 and 66), it should be appreciated that other degrees or rounding and no rounding at the constriction are also within the scope of the present disclosure.

Referring to FIG. 7, the relationship between voltage and flow velocity forms a nonlinear curve that can be fit to a linear algorithm, such as a forth order polynomial or a multiple point interpolation, for calibration purposes, as mentioned above. A curve fit can use a minimum number of calibration points (such as one, two, or three calibration points) to calibrate the mass flow sensor 24 with an approximately 4% level of accuracy. A multiple interpolation can use a plurality of points. In one embodiment, the multiple point interpolation includes interpolating less than 18 points to fit a plurality of curves between adjacent points. In another embodiment, the multiple point interpolation includes interpolating less than 10 points to fit a plurality of curves between adjacent points. It should be appreciated that it is important to have a smooth curve for a multiple point interpolation process because outliers from the curve generally cannot be interpolated.

For small devices, such as the distal tip 20 of the fluid velocity probe 100 described herein, such a curve is not achievable if the aerodynamics of the housing 22 relative to the sensor 24 have not been optimized. The following non-limiting EXAMPLE is directed to a specific embodiment of an optimized housing, wherein the relationship between voltage and flow velocity shown in FIG. 7 for this embodiment is shown as smooth curve A, which is capable of being fit to a linear algorithm. In contrast, a housing that has not been aerodynamically optimized might have steps in the relationship between voltage and flow velocity, as seen in an exemplary curve B. In that regard, curve B can not be fit to a linear algorithm for calibration purposes.

EXAMPLE

As a non-limiting example, a suitable distal tip, as best seen in FIGS. 3-5, is provided. The distal tip is a about 4 mm diameter substantially cylindrical tip. The passageway is a rectangular passageway having a width of about 3.88 mm and a length of about 6.58 mm. The corners of the rectangular passageway are rounded to about a 0.99 mm radius corner.

The sidewalls are substantially symmetrical, having leading and trailing edges rounded to a 0.64 mm radius. Further, the sidewalls have about a 10 degree taper at the inlet and about a 25 degree taper at the outlet. At the constriction, the blending between the inlet and outlet tapers includes a rounded sidewall having a radius of about 2.54 mm. In addition, the upper and lower walls have similar inlet and outlet tapers, about 10 degrees at the inlet and about 25 degrees at the outlet, and similar blending between tapers, including a rounded sidewall having a radius of about 2.54 mm. In that regard, the inlet and outlet tapering is uniformly cut around the periphery of the substantially rectangular passageway.

The sensor is substantially centered in the passageway between the first and second sidewalls and the exposed sensor has a width of about 2.40 mm and an exposed length of about 4.24 mm. The sensor is positioned in the passageway closer to the outlet of the passageway. The relationship between voltage and flow velocity for this embodiment is shown as curve A in FIG. 7.

While illustrative embodiments have been illustrated and described, it will be appreciated that various changes can be made therein without departing from the spirit and scope of the invention.

The embodiments of the invention in which an exclusive property or privilege is claimed are defined as follows:

1. A distal tip of a fluid velocity probe, comprising:
  (a) at least a portion of a housing having first and second sidewalls defining a passageway therebetween, the passageway having inlet and outlet regions, wherein the first and second sidewalls each are substantially symmetrical along an axis extending in the direction of the passageway through the center of each sidewall, and wherein the passageway includes a constriction between the inlet and outlet regions; and
  (b) a mass flow sensor disposed in the passageway between the inlet and outlet regions.

2. The distal tip of claim 1, wherein the at least a portion of the housing is substantially cylindrical.

3. The distal tip of claim 2, wherein the at least a portion of the housing has a diameter of less than or equal to about ⅜-inch.

4. The distal tip of claim 1, wherein the first and second sidewalls are substantially identical in size and shape.

5. The distal tip of claim 1, wherein each of the first and second sidewalls taper in the inlet and outlet regions to form a constriction between the inlet and outlet regions.

6. The distal tip of claim 1, wherein the passageway is further defined by lower and upper walls and wherein the lower and upper walls taper in the inlet and outlet regions to form a constriction between the inlet and outlet regions.

7. The distal tip of claim 5, wherein each of the first and second sidewalls taper in the inlet region in the range of 5 to 15 degrees and in the outlet region in the range of 5 to 30 degrees from the respective center axes of the first and second sidewalls extending in the direction of the passageway.

8. The distal tip of claim 6, wherein each of the lower and upper walls taper in the inlet region in the range of 5 to 15 degrees and in the outlet region in the range of 5 to 30 degrees from respective planes tangential to the lower and upper walls at the constriction.

9. The distal tip of claim 1, wherein the mass flow sensor is a thermal mass flow sensor.

10. The distal tip of claim 1, wherein the mass flow sensor is positioned substantially equidistantly in the passageway between the first and second sidewalls.

11. The distal tip of claim 1, wherein the inlet region is greater in length than the outlet region.

12. The distal tip of claim 1, wherein the first and second sidewalls have rounded edges.

13. A distal tip of a fluid velocity probe, comprising:
  (a) at least a portion of a substantially cylindrical housing, wherein the housing includes first and second sidewalls defining a passageway therebetween having inlet and outlet regions, wherein the passageway includes a constriction between the inlet and outlet regions, and wherein the housing has a diameter of less than or equal to about ⅜-inch; and
  (b) a thermal mass flow sensor disposed in the passageway between the inlet and outlet regions.

14. The distal tip of claim 13, wherein the first and second sidewalls are substantially identical in size and shape.

15. The distal tip of claim 13, wherein each of the first and second sidewalls taper in the inlet and outlet regions to form a constriction between the inlet and outlet regions.

16. The distal tip of claim 13, wherein the passageway is further defined by lower and upper walls and wherein the lower and upper walls taper in the inlet and outlet regions to form a constriction between the inlet and outlet regions.

17. The distal tip of claim 13, wherein each of the first and second sidewalls taper in the inlet region in the range of 5 to 15 degrees and in the outlet region in the range of 5 to 30 degrees from the respective center axes of the first and second sidewalls extending in the direction of the passageway.

18. The distal tip of claim 16, wherein each of the lower and upper walls taper in the inlet region in the range of 5 to 15 degrees and in the outlet region in the range of 5 to 30 degrees from respective planes tangential to the lower and upper walls at the constriction.

19. The distal tip of claim 15, wherein the inlet region is greater in length than the outlet region.

20. The distal tip of claim 13, wherein the mass flow sensor is positioned substantially equidistantly in the passageway between the first and second sidewalls.

21. A distal tip of a fluid velocity probe, comprising:
(a) at least a portion of a housing having first and second sidewalls defining a passageway therebetween having inlet and outlet regions; and
(b) a thermal mass flow sensor disposed in the passageway between the inlet and outlet regions, wherein the sensor measures an electrical property delivered to the sensor to maintain a predetermined temperature at the sensor, and wherein the relationship between the electrical property and the mass flow of surrounding fluid is a curve that can be fit to at least one of a fourth order polynomial and a multiple point interpolation.

22. The distal tip of claim 21, wherein the multiple point interpolation includes interpolating less than 18 points to fit a plurality of curves between adjacent points.

23. The distal tip of claim 21, wherein the multiple point interpolation includes interpolating less than 10 points to fit a plurality of curves between adjacent points.

24. The distal tip of claim 21, wherein the electrical property is selected from the group consisting of voltage, current, and power.

25. The distal tip of claim 21, wherein the passageway is aerodynamically configured to substantially reduce fluid eddies in the outlet region.

26. The distal tip of claim 1, wherein the constriction is a cross-sectional plane of the passageway having substantially the most constricted flow area.

27. The distal tip of claim 13, wherein the constriction is a cross-sectional plane of the passageway having substantially the most constricted flow area.

\* \* \* \* \*